(12) United States Patent
Corcodel et al.

(10) Patent No.: US 10,977,480 B2
(45) Date of Patent: Apr. 13, 2021

(54) DETECTION, TRACKING AND 3D MODELING OF OBJECTS WITH SPARSE RGB-D SLAM AND INTERACTIVE PERCEPTION

(71) Applicant: Mitsubishi Electric Research Laboratories, Inc., Cambridge, MA (US)

(72) Inventors: Radu Ioan Corcodel, Quincy, MA (US); Diogo Rodrigues Marcal de Almeida, Stockholm (SE)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 180 days.

(21) Appl. No.: 16/365,831

(22) Filed: Mar. 27, 2019

(65) Prior Publication Data
US 2020/0311971 A1    Oct. 1, 2020

(51) Int. Cl.
*G06K 9/00* (2006.01)
*B25J 9/00* (2006.01)
(Continued)

(52) U.S. Cl.
CPC ........ *G06K 9/00201* (2013.01); *B25J 9/0096* (2013.01); *B25J 9/1697* (2013.01);
(Continued)

(58) Field of Classification Search
CPC .............................................. G06K 9/00201
See application file for complete search history.

(56) References Cited

U.S. PATENT DOCUMENTS

2018/0161986 A1\* 6/2018 Kee ........................... G06T 7/75
2018/0290307 A1\* 10/2018 Watanabe .............. B25J 9/1612
(Continued)

*Primary Examiner* — Thomas Randazzo
(74) *Attorney, Agent, or Firm* — Gennadiy Vinokur; James McAleenan; Hironori Tsukamoto

(57) ABSTRACT

An object detection system for detecting and manipulating objects on a workspace includes a three dimensional (3D) sensor configured to acquire and transmit point clouds of a scene, each point cloud including one or more objects in the workspace, manipulator configured to move or grip each of the one or more objects, a memory to store the images and a computer executable program including an object detection-localization program, a segmentation program, a gripping-moving program and a geometry reconstruction program, a processor to perform the computer executable program using the images in connection with the 3D sensor, the memory and the manipulator. The computer executable program is configured to cause the processor to perform steps of generating frames including the point clouds and measurements, generating an initial map from a first frame, moving part of the one or more objects by using the manipulator using the first image, acquiring, after the moving step, a second frame, generating a first dynamic map and a static map from the initial map using the second frame, moving another part of the one or more objects based on the first dynamic map, splitting at least one dynamic map among the first dynamic map and the second dynamic maps when the at least one dynamic map includes a segment being outlier with respect to the one or more objects, reconstructing a 3D geometry of the one or more objects from the split map, and determining when the one or more objects are separated from each other.

21 Claims, 9 Drawing Sheets

(51) Int. Cl.
*G06T 7/55* (2017.01)
*G06T 7/73* (2017.01)
*B25J 9/16* (2006.01)
*G06T 17/05* (2011.01)
*G06K 9/62* (2006.01)
*G06K 9/32* (2006.01)
*G06K 9/46* (2006.01)

(52) U.S. Cl.
CPC ....... *G06K 9/00664* (2013.01); *G06K 9/3241* (2013.01); *G06K 9/4671* (2013.01); *G06K 9/6211* (2013.01); *G06T 7/74* (2017.01); *G06T 17/05* (2013.01); *G06T 2200/04* (2013.01); *G06T 2200/08* (2013.01); *G06T 2207/10028* (2013.01)

(56) References Cited

U.S. PATENT DOCUMENTS

| | | | |
|---|---|---|---|
| 2019/0022863 A1* | 1/2019 | Kundu | B25J 9/1669 |
| 2019/0143507 A1* | 5/2019 | Nishina | B25J 9/1669 |
| | | | 700/245 |
| 2019/0278991 A1* | 9/2019 | Hayashi | G06K 9/2036 |
| 2019/0308320 A1* | 10/2019 | Konishi | G06K 9/00208 |
| 2019/0381670 A1* | 12/2019 | Correll | B25J 9/106 |
| 2020/0082209 A1* | 3/2020 | Liu | G06F 17/16 |
| 2020/0273138 A1* | 8/2020 | Chavez | G06T 1/0014 |

\* cited by examiner

Algorithm 1 Segment Classification

Input: $\mathcal{M}, \mathcal{S}$
Output: $\mathcal{S}_r, \mathcal{S}_m$ and $\mathcal{S}_u$ 1: procedure SEGMENTCLASSIFICATION
2:   $\mathcal{S}_r \leftarrow \{\emptyset\}$
3:   $\mathcal{S}_m \leftarrow \{\emptyset\}$
4:   $\mathcal{S}_u \leftarrow \{\emptyset\}$
5:   $j \leftarrow 1$
6:   while $j \leq |\mathcal{S}|$ do
7:     if $\mathcal{M}.registered(S^j)$ is *true* then
8:       $\mathcal{S}_r \leftarrow \mathcal{S}_r \cup \{S^j\}$
9:     else
10:       if $\mathcal{M}.keypointMatched(S^j)$ is *true* then
11:         $\mathcal{S}_m \leftarrow \mathcal{S}_m \cup \{S^j\}$
12:       else
13:         $\mathcal{S}_u \leftarrow \mathcal{S}_u \cup \{S^j\}$
14:     $j \leftarrow j + 1$

FIG. 5

Algorithm 2 Map Management

Input: $\mathcal{M}$, new RGB-D frame $\mathcal{F}$
Output: Updated $\mathcal{M}$ 1: procedure MAPMANAGEMENT
2:   $\mathcal{S} \leftarrow getSegments(\mathcal{F})$
3:   $\mathcal{M}_{tmp} \leftarrow \mathcal{M}$
4:   for all $M \in \mathcal{M}_{tmp}$ do
5:     $\mathcal{S}_r, \mathcal{S}_m, \mathcal{S}_u \leftarrow$ SEGMENTCLASSIFICATION$(\mathcal{M}, \mathcal{S})$
6:     if $\mathcal{S}_m \neq \emptyset$ then
7:       $M' \leftarrow newMap(\mathcal{S}_r)$
8:       $M'' \leftarrow newMap(\mathcal{S}_m)$
9:       $\mathcal{M} \leftarrow \mathcal{M} \setminus M$
10:       $\mathcal{M} \leftarrow \mathcal{M} \cup \{M', M''\}$

FIG. 6

DETECTION, TRACKING AND 3D MODELING OF OBJECTS WITH SPARSE RGB-D SLAM AND INTERACTIVE PERCEPTION

FIELD OF THE INVENTION

This invention generally relates to a system for training a descriptor, more specifically to a method and a system for training a descriptor by an active-sampling and a system for detecting objects using an active-sampling trained neural network.

BACKGROUND OF THE INVENTION

When deployed in unstructured environments, autonomous systems face significant challenges in determining the geometric information relevant to execute their tasks. When tasked with manipulating objects, e.g., grasping or sorting objects from a cluttered environment, this challenge lies in correctly determining what an object is. Object recognition is a common task in computer vision, and several methods can be applied to obtain a scene segmentation with several object hypotheses. However, without priori object models, there is a high chance that the scene segmentation will not be perfect.

Interactive perception is a concept in robotics where by exploiting deliberate interactions with the environment, a robotic system is able to gather more information about it in ways that are not possible by passively reading visual sensor data. This concept has been applied by the robotics community to, e.g., enable object singulation, generate a 3D object model or verify segmentation hypothesis.

For instance, a simple scene segmentation algorithm can extract facets of object candidates and correspond to reasonably smooth and continuous surfaces in the observed scene. A robot interacts with these facets by poking them. If a significant motion of the facet occurs, they are considered a confirmed object hypothesis and a grasp is attempted. If no motion occurs, or if the facet cannot be tracked (e.g., if it were in fact the product of two objects in close proximity), the system continues testing the other facets.

Another approach uses a Simultaneous Localization And Mapping (SLAM) framework to simultaneously register the static scene of a robot's environment (i.e. immovable objects) and track objects that might be moving in the same scene. This system enables spawning a new SLAM map whenever a significant portion of non-registered keypoints occurs in a segmented area of space. These new maps are then registered independently of the static scene's map.

In this case, a limitation still exists as the risk of contamination between maps. The system relies on scene segmentation to add new features to its object maps, and if an object contacts with some other part of the environment, there is a risk of adding features that belong to other parts of the environment. This limits the usability of the system to scenes where isolated objects are moving in a static environment.

Thus, there is a need to provide a novel system and method that allow robots or automatic manufacturing machines for detecting, tracking and 3D modeling of objects on a workspace (worktable, workbench, an assembly table, etc.).

SUMMARY OF THE INVENTION

According to embodiments of the present invention, a robot system can leverage a sparse pointplane SLAM algorithm in an interactive perception context to independently detect and reconstruct 3D models of objects in a scene. This is achieved through the employment of a novel segment-classification algorithm and the management of multiple, independent SLAM maps. This can result roan integrated system which augments the scope of previous interactive perception works by not only testing segment hypotheses through interaction, but also accumulating information on existing hypotheses which enable the 3D model reconstruction. It becomes possible to reconstruct 3D models with a single, static, point of view, using a sparse-SLAM formulation, and maintain each hypothesis as an independent map. In addition, by performing object modelling and manipulation, instead of reconstructing the entirety of the robot's environment, the computation performed in a robot system can enormously reduce central processing unit (CPU or processor) usage, power consumption and/or network bandwidths usages. This can provide the improvement of the functions of the processor (CPU).

Further, another embodiment of the present invention is based on realization of a computer-implementable object detection method for detecting and manipulating objects on a workspace. In this case, the computer-implementable object detection method includes acquiring and transmit point clouds of a scene, each point cloud including one or more objects in the workspace by using a three dimensional (3D) sensor; generating frames including the point clouds and measurements by using a segmentation program; generating an initial map from a first frame received from the 3D sensor; moving part of the one or more objects by using the manipulator using the first frame by executing an object detection-localization program; acquiring, after the moving, a second frame using the segmentation program; generating a first dynamic map and a static map from the initial map using the second frame; moving another part of the one or more objects based on the first dynamic map, by executing a gripping-moving program using the manipulator, to generate second dynamic maps; splitting at least one dynamic map among the first dynamic map and the second dynamic maps when the at least one dynamic map includes a segment being outlier with respect to the one or more objects; removing the at least one dynamic map; reconstructing a 3D geometry of the one or more objects from the split map by using a geometry reconstruction program; and determining when the one or more objects are separated from each other based on the reconstructed 3D geometry.

Yet, further, some embodiments of the present invention are based on realization that a non-transitory computer-readable storage medium having computer-executable instructions for detecting and manipulating objects on a workspace by a processing system. The computer-executable instructions include acquiring and transmit point clouds of a scene, each point cloud including one or more objects in the workspace by using a three dimensional (3D) sensor; generating frames including the point clouds and measurements by using a segmentation program; generating an initial map from a first frame received from the 3D sensor; moving part of the one or more objects by using the manipulator using the first frame by executing an object detection-localization program; acquiring, after the moving, a second frame using the segmentation program; generating a first dynamic map and a static map from the initial map using the second frame; moving another part of the one or more objects based on the first dynamic map, by executing a gripping-moving program using the manipulator, to generate second dynamic maps; splitting at least one dynamic map among the first dynamic map and the second dynamic maps when the at least one, dynamic map includes a segment being outlier with respect to the one or more objects; removing the at least one dynamic map; reconstructing a 3D geometry of the one or more objects from the split map by using a geometry reconstruction program; and determining when the one or more objects are separated from each other based on the reconstructed 3D geometry.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 5 shows an algorithm of segment classification, according to embodiments of the present invention;

FIG. 6 shows an algorithm of map management, according to embodiments of the present invention;

Figure 1:
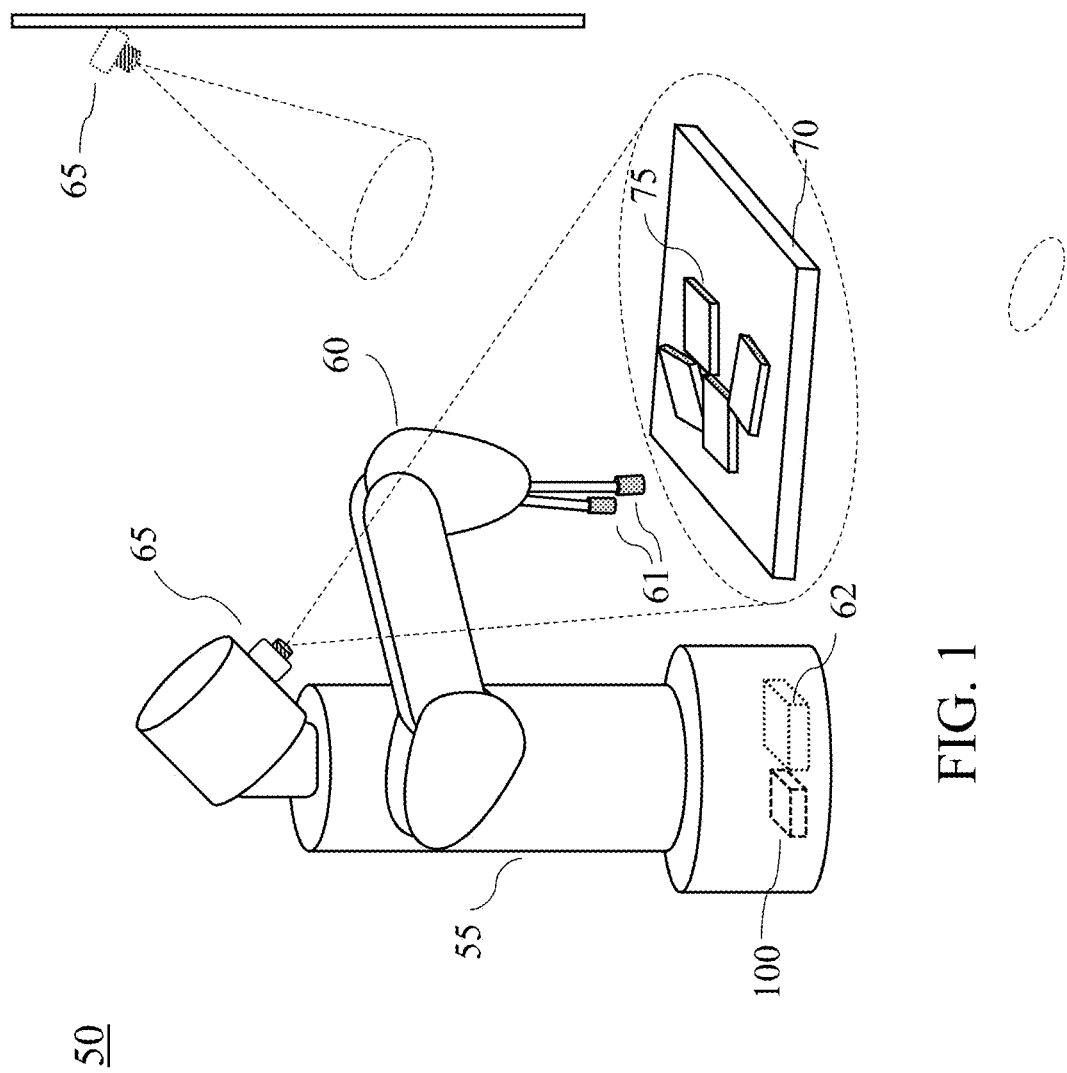
FIG. 1 is an example illustrating a robotic system, according to embodiments of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

It would be noted that a computer system may be referred to as a system. Further, the model parameters may be referred to as weighting parameters.

Overview of Detecting and Tracking Multiple Objects

FIG. 1 is an example illustrating a robotic system 50 that can detect, track and manipulate objects 75 on a workspace 70, according to embodiments of the present invention. In this case, the workspace 70 has edges or ends of a workplace that can support the objects 78 on it. Further, positions of the edges or end of the workspace 70 may be preliminary determined as the limits of the workspace 70 and stored in a storage 130 or a memory 140, or the robotic system 50 may determine the limits of the workspace 70 by using one or combination of programs (program modules) 131-135 while acquiring point clouds (images) via a camera 111. The robotic system 50 may be referred to a robot or an object handling/manipulating system that can be arranged in a manufacturing process line or a standalone object handling line in a factory. The robotic system 50 may include a mobile mechanics (not shown), a base, a head, a main body 55, an arm (or arms) 60 including a manipulator (manipulators) 61, an object detection system 100 including an input/output (I/O) interface 110 connected to actuators 112 (not shown)

of the manipulator 61 and the arm 60 for manipulating the objects 75 on the workspace 70 (or worktable). In some cases, the manipulator 61 may include one or more manipulating parts (hands or fingers) to move and grip part of the objects or each object 75 on the workspace 70. The object detection system 100 may include a camera 65 that is connected to the interface 110 via a wired channel or a wireless channel, and the camera 65 can take RBG-D frames as images and generate point clouds with respect to objects 75 from the RBG-D frames. The camera 65 may be disposed on a part of the robotic system 50 or a position separated from the robotic system 50 such that the camera 65 can detect the objects 75 on the workspace 70. Further the camera 65 is connected to the object detecting system 100 via a wired communication channel or a wireless communication channel using an I/O interface 110.

Further, the robot arm 60 may include a vacuum gripper(s) to pick or grip each object 75. The camera 65 may be a VGA (640×480) resolution color and depth images. The images (frames) taken by the camera 65 are converted to 3D point clouds and each point has both a 3D coordinate and a color value. Further, the robot arm 60 includes a localization controller (not shown) that localizes the end of the manipulator 61 to a desired position according to the signals from the interface 110. The desired position is determined based on processed data generated by the object detecting system 100. The robot arm 60 includes a motion control circuit (not shown) for controlling the movement of the robot arm 60. The motion control circuit operates the robot arm 60 and is connected to the system 100 via a cable connection or a wireless communication. Further the system 100 may be arranged outside the robot arm 60.

Figure 2:
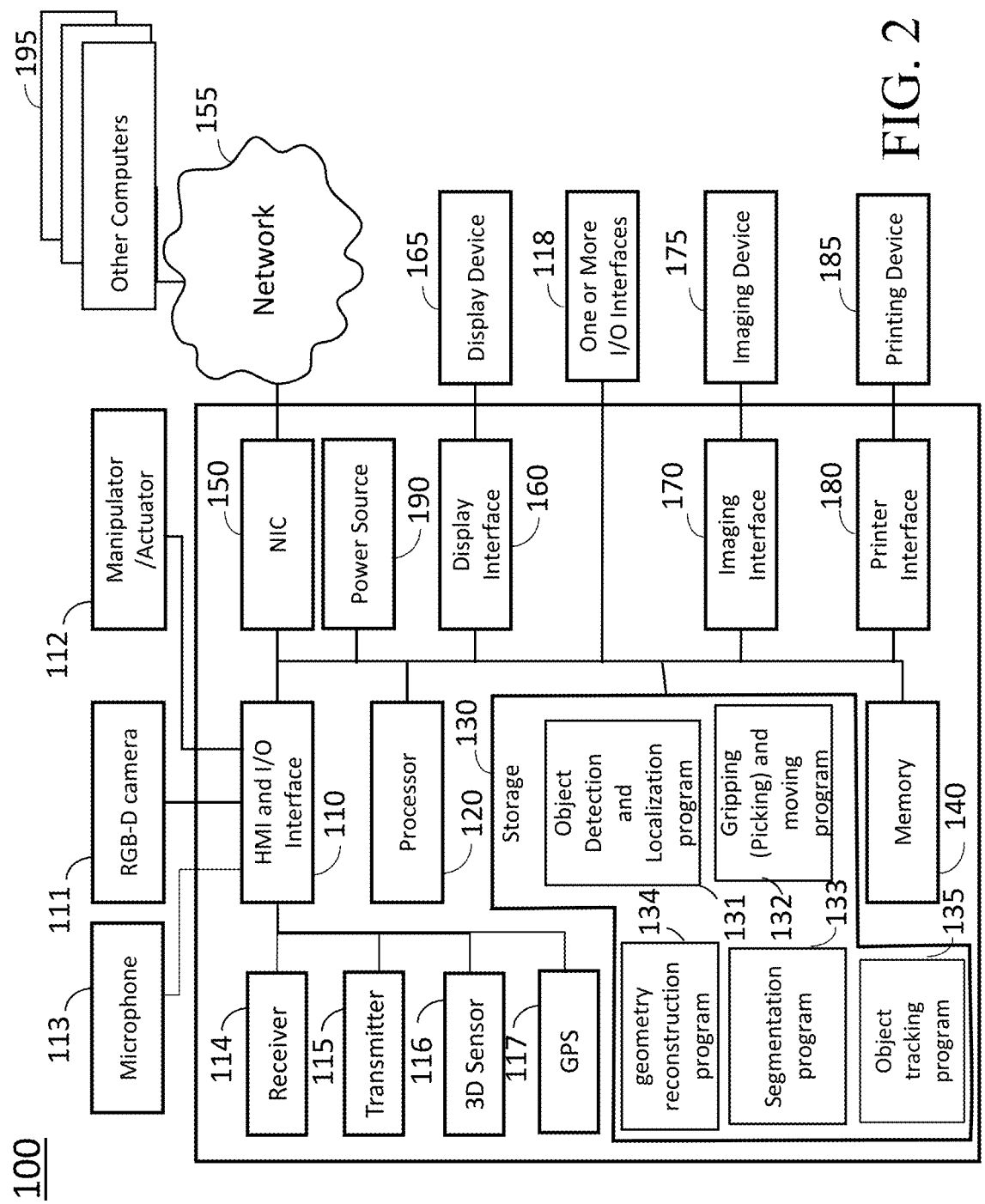
FIG. 2 is a block diagram illustrating the object detection system, according to embodiments of the present invention.

FIG. 2 is a block diagram illustrating the object detection system 100 for detecting, tracking and 3D modeling of objects according to embodiments of the present disclosure.

The object manipulation system 100 can include a human machine interface (HMI) with I/O interface 110 connected to at least one RGB-D camera 65 and the manipulator/actuator 112 of the robotic system 60. Further the object manipulation system 100 can include a microphone 113, a receiver 114, a transmitter 115, a 3D sensor 116, a global positioning system (GPS) 117, one or more I/O interfaces 118, a processor 120, a storage device 130, a memory 140, a network interface controller 150 (NIC) connectable with a network 155 including local area networks and internet network (not shown), a display interface 160 connected to a display device 165, an imaging interface 170 connectable with an imaging device 175, a printer interface 180 connectable with a printing device 185. The RGB-D camera may be arranged apart from the robotic system 60 and can be connected to the system 100 via the I/O interface 110. The I/O interface 110 may include analog/digital and digital/analog converters and can include a wireless communication interface.

The I/O interface 110 includes a wireless communication interface that can communicate with other object detection and localization systems or other computers via wireless internet connections or wireless local area networks, which enable to perform remote multiple object detection and localization. The image processing system 100 can include a power source 190. The power source 190 may be a battery rechargeable from an external power source (not shown) via the I/O interface 118. Depending upon the application the power source 190 may be optionally located outside of the system 100.

The HMI and I/O interface 110 and the I/O interfaces 118 can be adapted to connect to another display device (not shown) including a computer monitor, camera, television, projector, or mobile device, among others.

The image processing system 100 can receive electric text/imaging documents including speech data via the network 155 connected to the NIC 150. The storage device 130 includes an object detection and localization program (module) 131, a gripping (Picking) and moving program 132, a segmentation program (module) 133, and a geometry reconstruction program (module) 134.

In this case, algorithms of the object detection and localization program 131, the gripping and moving program 132, the segmentation program 133, and the geometry reconstruction program (module) 134 are stored into the storage 130 as coding data. The program modules 131-134 may be stored to a computer readable recording medium (not shown) so that the processor 120 can execute the algorithms of the program modules 131-134 from the medium. Further, the pointing device/medium 112 may include modules that read programs stored on a computer readable recording medium.

For instance, the program 131 may include a program module of an object identifier that clusters a first cluster of first pixels and a second cluster of second pixels among pixels of the image so that a single transformation transfers the first pixels to the second pixels, respectively. Further, the program may include a program module of an object locator to determine a first pose of an object represented by the first pixels of the first cluster. In this case, a first group formed by the first pixels of the first cluster matches to a second group formed by the second pixels of the second cluster when a first appearance of any pixel of the first group matches to a second appearance of a pixel of the second group and a first distance between any pair of pixels in the first group matches a second distance between a pair of corresponding appearance matching pixels in the second group.

Further, the program 131 may include a program module of a feature extractor to extract features of the objects in the image based on the intensity values of the pixels, a program module of a feature pair finder to find feature match pairs of the objects from the extracted features based on an appearance similarity of the extracted features, wherein the appearance similarity is defined by the intensity values of the pixels, a program module of a triplet generator to generate triplets from the feature match pairs, a program module of a matching finder to find matched triplets from the generated triplets based on a geometric similarity, and a program module of a clustering module to cluster sets of the triplet pairs having similar transformations defined by predetermined parameters.

In order to start acquiring an image data using the sensor 116, instructions may be transmitted to the system 100 using a keyboard (not shown) or a start command displayed on a graphical user interface (GUI) (not shown), the pointing device/medium 112 or via the wireless network or the network 190 connected to other computers 195. The acquiring of the image may be started in response to receiving an acoustic signal of a user by the microphone 113 using pre-installed conventional speech recognition program stored in the storage 130.

The processor 120 may be a plurality of processors including one or more graphics processing units (GPUs). The storage 130 may include speech recognition algorithms (not shown) that can recognize speech signals obtained via the microphone 113.

Further, the image processing system 100 may be simplified according to the requirements of system designs. For instance, the image processing system 100 may be designed by including the at least one RGB-D camera 111, the interface 110, the processor 120 in associating with the memory 140 and the storage 130 storing the object detection and localization program 131, and other combinations of the parts indicated in FIG. 1.

The image processing system 100 may be included or connected to a control system of a robotic arm (not shown) for manipulating objects based on the object detection and localization program 131 with at least one RGB-D camera 111 mounted near a handling portion of the robotic arm. As an example, a robotic arm system 60 including the image processing system 100 and an RGB-D camera is shown in FIG. 1. Further, some functions of the program modules 131-135 will be discussed below.

The detected objects are continuously tracked by an object tracker program 135, including the case when the object orientation changes with respect to the viewpoint of the camera 111. The objects in the scene change orientation due to interaction with the robot arm 60 which is controlled by the picking/moving program 132.

In accordance with embodiments of the present invention, it allows to detect and track multiple objects, simultaneously and independently, by leveraging a sparse SLAM algorithm which registers points and planes in the 3D space. We will use the standard definitions of measurements and landmarks in the context of SLAM: measurements are extracted by the system from the available RGB-D data, and are associated to landmarks in a map. Each detected object is tracked in its own map, in contrast with methods that add objects to the state information in a single map, or segments them out of a map. When our system receives a new RGB-D frame, the system 100 in the robotic system 60 processes it to extract point and plane measurements, and perform depth based segmentation. The measurements are used to register each frame with respect to all of the existing maps in the system. The outcome of this registration procedure is used to classify the segments and allow us to prevent contamination between maps. A map is split into two independent hypotheses, if the outcome of an interaction results in segments that do not register properly with any map.

The following descriptions provide a short background on pointplane SLAM and how we perform registration of novel RGBD frames. Then, we detail our segment classification approach and how it enables managing all the available maps in the system.

Definitions

Figure 3:
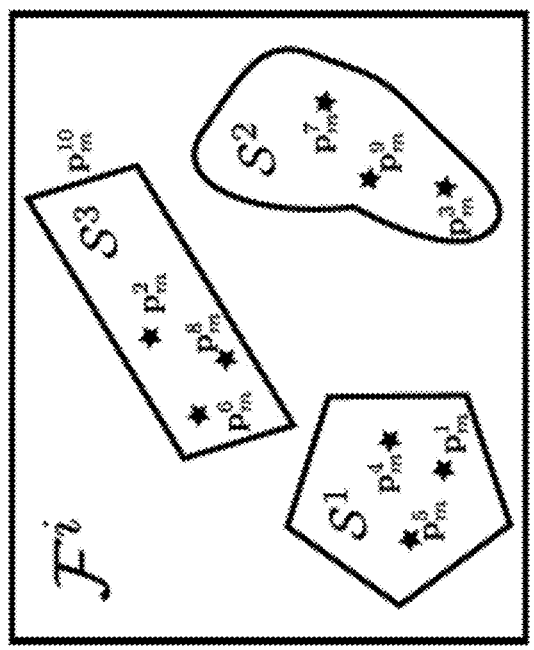
FIG. 3 shows symbolic depiction of a processed frame, $F^i$, according to embodiments of the present invention.

FIG. 3 illustrates the concepts of definitions of objects. FIG. 3 shows symbolic depiction of a processed frame, $F^i$. In this example, there are 9 points and one plane measurements. The plane measurement, $p_m^{10}$, is used to initialize a segment, $S^3$. Depth-based segmentation obtained two other segments. For this frame we have $$\mathcal{P} = \{p_m^1, \ldots, p_m^{10}\}, \text{ and}$$

$$S^1 = \{p_m^1, p_m^4, p_m^5\}; S^2 = \{p_m^3, p_m^7, p_m^9\}; S^3 = \{p_m^2, p_m^6, p_m^8\}.$$

We denote our measurements as $p_m$ and their corresponding landmarks are expressed as $p_l$. Measurements can be points or planes, and their corresponding landmarks will store the set of features associated with the measurement. In case of point measurements, these features are keypoint descriptors, extracted using SIFT, while for the plane landmarks we store the plane parameters and the set of inlier points of the associated plane measurements. The set of all measurements in a frame F is given by $P = \{p_m^1, \ldots, p_m^k\}$. A segment is defined as a collection of measurements in a frame, $S = \{p_m^i, p_m^j, \ldots, p_m^k\}$, and the set of all segments in a frame is denoted as $S = \{S^1, \ldots, S^n\}$.

A keyframe, KF, is an RGB-D frame, which is added to a map. In our system, a frame is marked as keyframe if its registered pose, in a common reference, differs sufficiently from the registered poses of all the other keyframes in a map.

Figure 4:
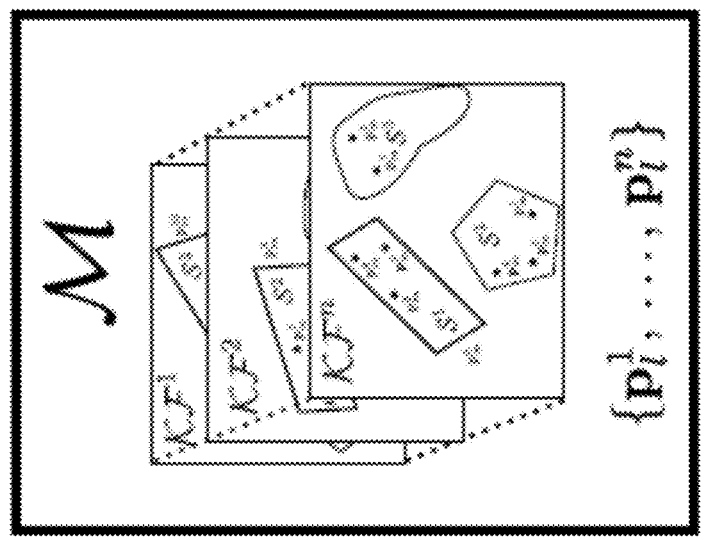
FIG. 4 shows an example of a map accumulating a set of keyframes, KFi, and a list of landmarks, according to embodiments of the present invention.

Our system maintains a set of maps $\mathcal{M} = \{\mathcal{M}^1, \ldots, \mathcal{M}^n\}$, where each map is an independent collection of keyframes and landmarks, as seen in FIG. 4. In this case, the figure illustrates an example of a map accumulating a set of keyframes, $KF^i$, and a list of landmarks. These contain the features required to match measurements in a frame with each map's landmarks. In this work, we aim at building a set of independent maps, each one storing only landmarks pertaining to one object hypotheses.

Finally, we can define sets of inlier and matched point measurements for every frame P with respect to each map $M^k \in M$. The inlier set $I^{i,k}$ contains all point measurements that have been successfully registered to some landmark $p_l \in M^k$. The set of matched measurements $J^{i,k}$ will contain all point measurements, which have been matched with keypoint descriptors from some landmark in the map, using the ratio test.

Registration

The goal of the registration process is to determine the rigid body transform $T^{i,k} \in SE(3)$ from the i-th frame given to the system, to the coordinate system of the k-th map in A for all maps. To this end, we employ a multi-group registration scheme, consisting in sequential frame-based and segment-based registration algorithms, which aim at solving the optimization problem, $$\hat{T}^{i,k} = \underset{T^{i,k}}{\operatorname{argmin}} \sum_{p_m \in I^{i,k}} d(T^{i,k}(p_m), p_l), \quad (1)$$

in a RANSAC framework, where the distance operator $d(\bullet,\bullet)$ computes the distance between features.

Segment Classification

In this work, we propose a novel method of segment classification based on the outcome of the multi-group registration procedure and the accumulated keypoint descriptors available in each map. This classification is the cornerstone of our map management algorithm, which allows us to create and update object hypotheses through the creation and splitting of SLAM maps.

For the current frame P and all the maps $M^k \in M$, we start by classifying the set of registered segments, $$S_r^k = \left\{ S^j \in S \,\middle|\, \frac{|S^j \cap I^{i,k}|}{|S^j|} > \delta_r, 0 < \delta_r \leq 1 \right\}, \quad (2)$$

which are defined as segments that have a high ratio of inlier measurements $p_m \in I^{i,k}$ to the total amount of measurements in the segment, given by its cardinality $|S^j|$. We then partition the non-registered segments into two complementary sets: matched and unmatched segments, respectively $0_m^k$ and $S_u^k$. For every map we will thus obtain $$S = S_r^k \cup S_m^k \cup S_u^k$$

$$S_r^k \cap S_m^k = \emptyset; \, S_r^k \cap S_u^k = \emptyset; \, S_m^k \cap S_u^k = \emptyset \quad (3)$$

A non-registered segment will belong to $S^k_m$ if we successfully match enough of its measurements' descriptors to the descriptors in $M^k$, $$S_m^k = \{S^j \in S | |S^j \cap \mathcal{J}^{i,k}| > \alpha_m, \alpha_m \in \mathbb{N}^+\}. \quad (4)$$

This will happen when multiple objects are associated to $M^k$, and a subset of these objects is disturbed due to robotic interaction. The remaining segments are novel to the map, and are thus unregistered and unmatched, and will be assigned to $S^k_u$. Algorithm 1 of FIG. 5 illustrates this procedure, where M.registered($S^j$) and M.keypointMatched ($S^j$) correspond to the inequalities in equations (2) and (4), respectively.

Detecting, Tracking and Reconstructing Objects in the Environment

The goal of our system is to detect objects in the robot environment, and to track them while building a 3D object model. This is achieved by iterating over the set of maps M, and updating, destroying and creating new maps based on the outcome of successive interactions with the environment. We assume that the environment will be disturbed only as a consequence of these interactions.

We start by processing every new frame provided to the system, and obtain the registration transformations from eq. (1). For every map $M^k \in M$, we then execute Algorithm 1. This results in a per-map partition of the available segments, which follows equation (3).

Once a map $M^k$ has $S^k_m = \emptyset$, we split $M^k$ and generate two new maps, one where we store the measurements of $S^k_r$ as landmarks, the other with the measurements from $S^k_m$. The original map is removed from the system.

Figure 8:
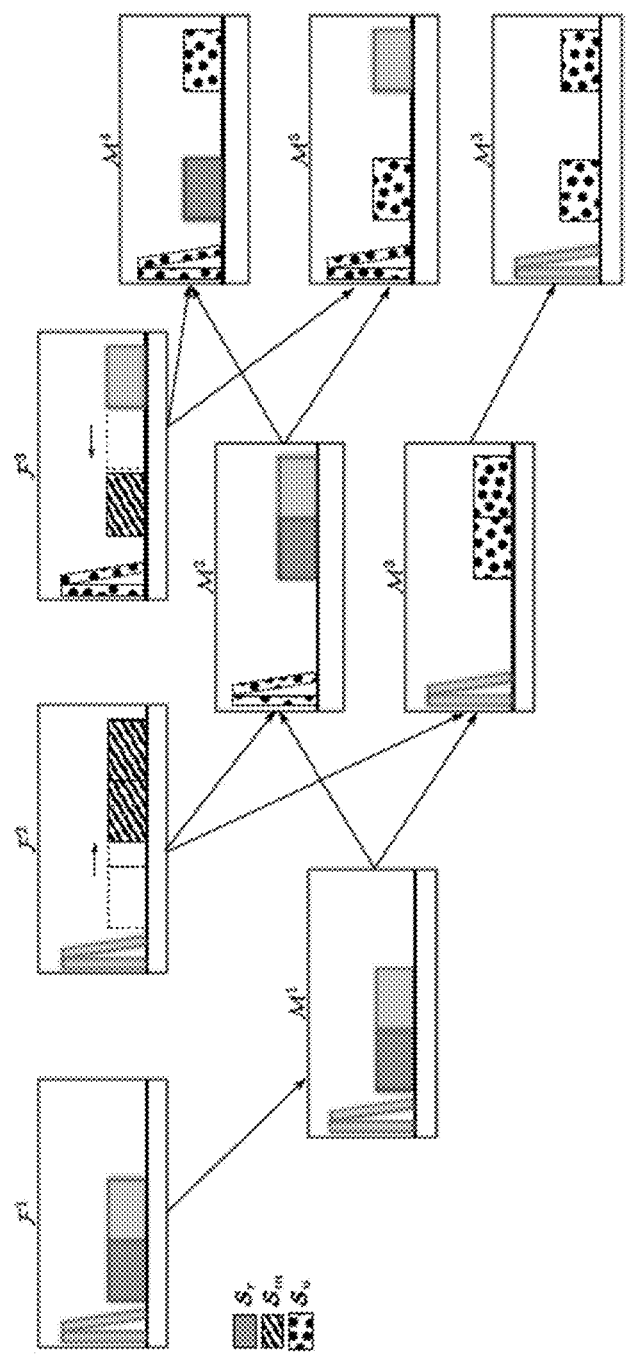
FIG. 8 shows a simple example of map splitting procedure, according to embodiments of the present invention.

This process allows our system to detect object hypotheses as the set of segments that moved with respect to the dominant motion pattern of a map, and to additionally improve on these hypotheses through subsequent map splitting. FIG. 8 depicts a simple example of map splitting procedure. On the top, three consecutive frames are presented to the system. A scene disturbance occurs in between each frame. The segment partition is illustrated for the frames with respect to the map that was split, i.e., segments are outlined for $F^1$ and $F^2$ with respect to $M^1$ and $F^3$ is outlined with respect to $M^2$. The final set of maps is $M = \{M^3, M^4, M^5\}$.

When $S^k_m = \emptyset$, we update each $M^k$ with the measurements of $S^k_r$, if the current frame is determined to be a keyframe to that map. We obtain a 3D reconstruction of any given map by recovering all the registered segments from all the keyframes in the map.

Handling Map Contamination

A significant challenge of maintaining multiple independent maps lies in handling map contamination. When interacting with objects in cluttered scenes, it is common for tracked objects to get in close proximity with other tracked objects or objects in the static scene. When this happens, a new frame's segment can contain elements belonging to two or more maps, FIGS. 7A-7C.

Figures 7A, 7B, 7C:
FIG. 7A, FIG. 7B and FIG. 7C are illustrations of map contamination, according to embodiments of the present invention.

FIG. 7A, FIG. 7B and FIG. 7C are Illustration of map contamination. Two objects, a crayola box and a toiletry kit, are being modelled by two independent maps which, due to interaction, are brought in contact, FIGS. 7A and 7B, respectively. If the depth based segmentation algorithm segments both objects together, the maps might be updated incorrectly, generating an incorrect model, FIG. 7C.

We handle these cases by adopting the assumption that $S_r$ and $S_m$ cannot overlap for two different maps. We refrain from updating two maps $M^k$, $M^l \in M$, $k \neq l$ if any of the following conditions are satisfied: a) $S^l_r \cap S^k_r \neq \emptyset$; b) $S^l_m \cap S^k_m \neq \emptyset$, or c) $S^l_r \cap S^k_m \neq \emptyset$. In other words, a segment cannot: a) be registered simultaneously to two maps, b) be feature-matched to two maps or c) be registered to a map and feature-matched to another. When this happens, we assume that there is a risk of contamination between those maps. Maps in risk of contamination are still tracked, but not updated with new keyframes.

We thus create $\overline{M} \subset M$, where we keep only the maps without risk of contamination, $$\overline{M} = \left\{ M^k \in M \mid \forall_{M^{l \neq k} \in M} : \begin{matrix} S^k_r \cap S^l_r = \phi \wedge \\ S^k_r \cap S^l_m = \phi \wedge \\ S^k_m \cap S^l_m = \phi \end{matrix} \right\}. \quad (5)$$

The map management algorithm proposed in section III-D is executed on this subset, following Algorithm 2 in FIG. 6.

Unregistered and Unmatched Segments

On some occasions, we might have one or more unregistered and unmatched segments for all maps, $$S^j \in S_u^k \forall M \in M. \quad (6)$$

The circumstances that lead to this vary depending on the segmentation algorithm used to generate each frame's segments. In our work, we assume that the segmentation algorithm will tend to under-segment the observed scene. As such, segments that follow (6) will occur predominantly when a previously occluded object is revealed after an interaction, or if an object pose changes in such a way that a completely new side of it is revealed. We address these novel segments by adding them to the map with the closest registered pose to the segments' centroids, as further interactions will allow the system to correct the affected object hypothesis through map splitting.

Integrated System

In the previous section, we discussed a perception algorithm for detecting, tracking and modelling 3D objects that is built under the assumption that changes between RGB-D frames are due to actions exerted on the observed environment. To this end, we integrated the perception algorithm in a robotic manipulator from Fetch robotics, and designed a simple set of manipulation primitives to act on an observed scene. In this section, we describe this integrated system and the interaction logic we used to obtain the results from the experiment section discussed below.

Chosen Segmentation Algorithm

Our map management algorithm relies on the segment classification procedure illustrated in Algorithm 1 in FIG. 5. While the described approach is general, it requires segments with enough keypoint information to apply equations (2) and (4). Our implementation first extracts the dominant planes in the scene, such as walls and the supporting table plane, and marks these as segments. Since the employment of SIFT results in a need for reasonably large segments, to allow robust classification, we opt to under segment the remaining points in each RGB-D frame with the Euclidean cluster extraction method from the PCL library. Together with the plane segments, this strategy allows us to obtain clusters of objects on a planar surface as single segments.

Pushing

In some cases, the robot system relies on pushing primitives to interact with observed segments on a scene. Given a target position and a pushing direction, we position the robot end-effector behind the target and move it linearly along the pushing direction, for a preconfigured distance, with an optional small angular motion defined around the pushing target. This angular component allows the system to impart a larger rotation on the target, which is useful to gather a perspective with a richer set of measurements on the object. We take into account workspace constraints (related to a moving/pushing distance) by modifying the pushing distance if the resulting final position is outside the workspace boundaries.

Figure 9:
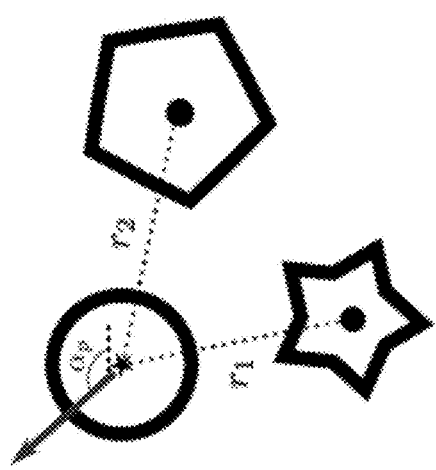
FIG. 9 shows a computed direction of an angle $\alpha_p$, with respect to a reference frame on the plane, according to embodiments of the present invention.

To decide on a pushing direction, we adopt an object singulation goal. Singulation facilitates the reconstruction of more complete object models, and it is a strategy that works well with the chosen segmentation algorithm, as objects in contact will tend to be segmented together. The system 100 determines (or computes) the direction that moves the target pushing point away from the segment centroids based on a simple artificial potentials approach, where each centroid in the robot workspace has a repulsive potential of $$U(r_i) = \frac{1}{r_i}, \quad (7)$$

where $r_i$ is the distance between the pushing point and the i-th centroid's position, projected on the pushing plane. From this computed direction we can extract an angle $\alpha_p$, with respect to a reference frame on the plane, FIG. 9. The figure illustrates that the pushing direction is drawn from a distribution centered on an angle, $\alpha_p$, obtained by computing the direction that minimize the artificial potential on the chosen pushing point. In this illustration, the chosen pushing point is marked as a star, and two segment centroids (full black circles) are used to compute the artificial potentials from eq. (7).

The system 100 is configured to use the angle as the first moment $\alpha_p$ of a Gaussian distribution with variance $\sigma_p^2$, from which we sample the actual pushing angle, $$\alpha \sim N(\alpha_p, \sigma_p^2). \quad (8)$$

This stochastic component helps the system 100 to avoid falling (the object(s) from the workspace) in local minima, where a clump of objects is pushed back and forth without being separated. In addition to segment centroids, we consider the supporting plane limits: the limit's closest point to the target is added as a repulsive point.

Grasping

The system 100 is configured to leverage the reconstructed models of our object hypotheses to inform a grasp pose detector (not shown). Given a target object hypothesis, we reconstruct its model as a point cloud and send it to the detector, which produces a set of proposals ranked in terms of how likely it is for the proposed pose to result in a stable grasp. The system 100 cycles from the highest to the lowest ranked grasp proposal and remove the proposals that violate workspace constraints. We then compute the inverse kinematics (IK) solutions of the remaining proposals using TRAC-IK. The highest ranking proposal with a valid IK solution is chosen as the grasp pose. For instance, a stereo depth sensor configuration can be used to obtain a more complete partial-view point cloud of the observed scene. A remarkable advantage of modelling the objects in the environment using SLAM is the ability to accumulate different viewpoints of the tracked objects with a single static depth sensor, and using the reconstructed point cloud to inform the grasp planner. We show how this accumulation of viewpoints enables our system to obtain better grasp proposals in section V-B.

Interaction Logic

To demonstrate our proposed method, the system 100 implement a simple interaction logic. In every iteration, the system 100 randomly samples a map from M, and produce a pushing direction for the centroid of its reconstructed model, as described in section IV-B. A relevant implementation detail of our system is that we keep track of which map is modelling the static scene of the robot, i.e., the set of segments that compose the dominant motion pattern of the observed scene. For every map that is not the static map, we generate grasping proposal candidates once a sufficient number of keyframes have been registered with the map, as this implies that the corresponding object hypothesis has been interacted with without the map being split, and thus there is a higher likelihood that the hypothesis is indeed a singulated object. If the grasp fails, the system attempts further pushing actions, to try and generate a more complete model for the grasp pose detector.

Experiments

Figure 10:
FIG. 10 shows a robot viewpoint indicating a plan of pushing actions on a support plane, according to embodiments of the present invention.

We deployed the integrated system in a human-centric environment, where several objects in contact with each other were laid on top of a table, which constitutes the supporting plane where pushing directions will be defined, seen from the robot viewpoint in FIG. 10 indicating a plan of pushing actions on a support plane, aligned with the depicted frame. We then executed the interaction logic from section IV-D.

We ran the perception algorithm on an Intel Core i7-7700K CPU at 4.20 GHz, with 64 GB of available memory, and the segment classification parameters from equations (2) and (4) were set as $\delta_r=0.7$ and $\alpha_m=10$. The standard deviation of the distribution in equation (8), from which we sampled the pushing direction angle was set as $\delta_p=0.4$ rad. As the segment classification system relies on rich keypoint information, we ignored segments where $|S^j|<20$. A frame $F^i$, registered with a map $M^k \in M$ that has either a translational or rotational components that differ, respectively, more than 5 cm or 0.087 rad from the latest registered keyframe in $M^k$ is added as a new keyframe to that map.

Detection, Tracking and Modelling Objects

Figure 11:
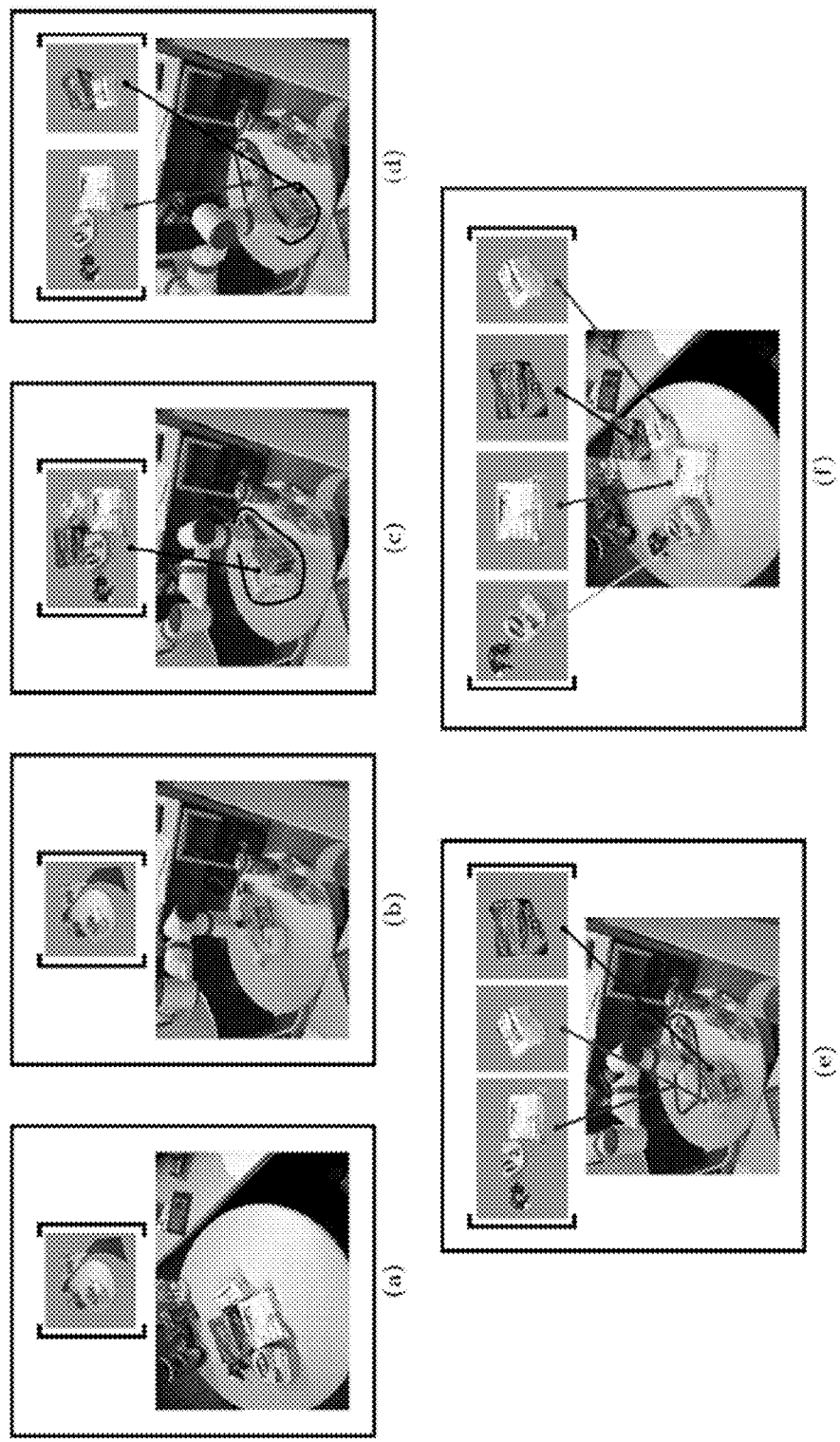
FIGS. 11(a)-11(f) show results from an experiment with four objects, according to embodiments of the present invention.

Results from an experiment with four objects are depicted in FIGS. 11(a)-11(f), where we show the initial configuration of the scene from the robot point of view, FIG. 11(a), and the executed actions from an external perspective, FIG. 11(b)-11(e). Every image is paired with an illustration of the reconstructed models from M. The experiment from FIG. 11 is shown in the submission video, together with experiments with different objects and initial workspace configurations.

Grasping

We tested the ability of the system of using the reconstructed object models to inform the grasp pose detector package. Once objects are singulated, we can plan a grasp using the reconstructed models. We tested the feasibility of this approach on some of the models by assuming that singulation is achieved once a map accumulates more than two keyframes, in experiments with multiple objects.

Figure 12:
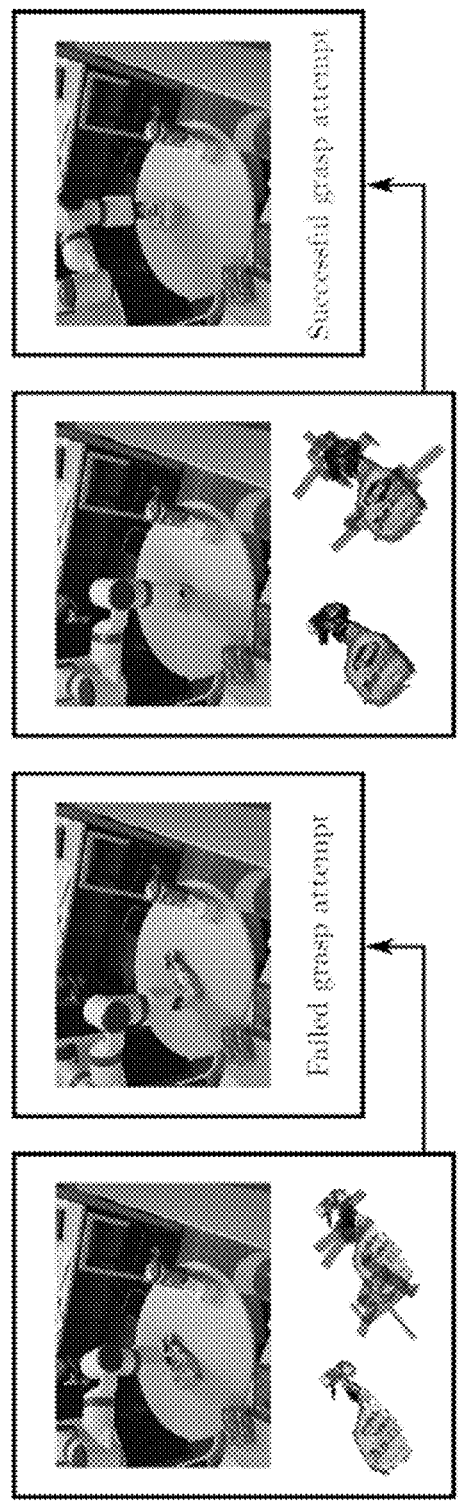
FIG. 12 shows failed grasp attempt and successful grasp attempt, according to embodiments of the present invention.

To test how adding information on existing object models helps in obtaining better grasp pose proposals, we ran experiments where we attempt a grasp after every push on an object hypothesis. While it is possible to obtain a successful grasping pose for maps with a single registered keyframe, we observed that more intricate geometries, such as the spray bottle, benefited from accumulating a higher number of keyframes, FIG. 12.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. An object detection system for detecting and manipulating objects on a workspace, comprising:
   a three dimensional (3D) sensor configured to acquire and transmit point clouds of a scene, each point cloud including one or more objects in the workspace;
   a manipulator configured to move or grip each of the one or more objects;
   a memory to store the images and a computer executable program including an object detection-localization program, a segmentation program, a gripping-moving program and a geometry reconstruction program;
   a processor to perform the computer executable program using the images in connection with the 3D sensor, the memory and the manipulator, wherein the computer executable program is configured to cause the processor to perform steps of:
   generating frames including the point clouds and measurements by using the segmentation program;
   generating an initial map from a first frame created by the segmentation program;
   moving part of the one or more objects by using the manipulator using the first frame by executing the gripping-moving program;
   acquiring, after the moving step, a second frame using the segmentation program;
   generating a first dynamic map and a static map from the initial map using the second frame;
   moving another part of the one or more objects based on the first dynamic map, by executing the gripping-moving program using the manipulator, to generate second dynamic maps;
   splitting at least one dynamic map among the first dynamic map and the second dynamic maps when the at least one dynamic map includes a segment being outlier with respect to the one or more objects;
   removing the at least one dynamic map;
   tracking the at least one or more objects included in a corresponding dynamic map remained after the removing, by executing an object tracker program;
   reconstructing a 3D geometry of the one or more objects from the split map by using the geometry reconstruction program; and
   determining when the one or more objects are separated from each other based on the reconstructed 3D geometry.

2. The system of claim 1, wherein the geometry reconstruction program is a sparse Simultaneous Localization and Mapping (SLAM) module.

3. The system of claim 1, wherein the manipulator moves the one or more objects for a predetermined distance with an angular motion defined around the one or more objects.

4. The system of claim 1, wherein a direction of the moving step is determined based on an artificial potentials approach, wherein a centroid of the one or more objects has a repulsive potential, and limits of the workspace have a repulsive potential.

5. The system of claim 1, wherein the moving steps are performed according to workspace constraints related to a moving distance and direction of motion.

6. The system of claim 5, wherein the moving distance is determined so as to avoid the one or more objects to exceed limits of the workspace by using angle as a first moment $\alpha_p$ of a Gaussian distribution with variance $\sigma_p^2$.

7. The system of claim 6, wherein the limits of the workspace are defined edges of the workspace.

8. A computer-implementable object detection method for detecting and manipulating objects on a workspace, comprising:
   acquiring and transmit point clouds of a scene, each point cloud including one or more objects in the workspace by using a three dimensional (3D) sensor;
   generating frames including the point clouds and measurements by using a segmentation program;
   generating an initial map from a first frame created by the segmentation program;
   moving part of the one or more objects by using the manipulator using the first frame by executing a gripping-moving program;
   acquiring, after the moving, a second frame using the segmentation program;
   generating a first dynamic map and a static map from the initial map using the second frame;
   moving another part of the one or more objects based on the first dynamic map, by executing the gripping-moving program using the manipulator, to generate second dynamic maps;
   splitting at least one dynamic map among the first dynamic map and the second dynamic maps when the at least one dynamic map includes a segment being outlier with respect to the one or more objects;
   removing the at least one dynamic map;
   reconstructing a 3D geometry of the one or more objects from the split map by using a geometry reconstruction program; and
   determining when the one or more objects are separated from each other based on the reconstructed 3D geometry.

9. The method of claim 8, wherein the geometry reconstruction program is a sparse Simultaneous Localization and Mapping (SLAM) module.

10. The method of claim 8, wherein the manipulator moves the one or more objects for a predetermined distance with an angular motion defined around the one or more objects.

11. The method of claim 8, wherein a direction of the moving step is determined based on an artificial potentials approach, wherein a centroid of the one or more objects has a repulsive potential, and limits of the workspace have a repulsive potential.

12. The method of claim 8, wherein the moving steps are performed according to workspace constraints related to a moving distance and direction of motion.

13. The method of claim 11, wherein the moving distance is determined so as to avoid the one or more objects to exceed limits of the workspace by using angle as a first moment $\alpha_p$ of a Gaussian distribution with variance $\sigma_p^2$.

14. The method of claim 13, wherein the limits of the workspace are defined edges of the workspace.

15. A non-transitory computer-readable storage medium having computer-executable instructions for detecting and manipulating objects on a workspace by a processing system, the computer-executable instructions comprising:
   acquiring and transmit point clouds of a scene, each point cloud including one or more objects in the workspace by using a three dimensional (3D) sensor;
   generating frames including the point clouds and measurements by using a segmentation program;
   generating an initial map from a first frame created by the segmentation program;
   moving part of the one or more objects by using the manipulator using the first frame by executing a gripping-moving program;
   acquiring, after the moving, a second frame using the segmentation program;
   generating a first dynamic map and a static map from the initial map using the second frame;
   moving another part of the one or more objects based on the first dynamic map, by executing the gripping-moving program using the manipulator, to generate second dynamic maps;
   splitting at least one dynamic map among the first dynamic map and the second dynamic maps when the at least one dynamic map includes a segment being outlier with respect to the one or more objects;
   removing the at least one dynamic map;
   reconstructing a 3D geometry of the one or more objects from the split map by using a geometry reconstruction program; and
   determining when the one or more objects are separated from each other based on the reconstructed 3D geometry.

16. The non-transitory computer-readable storage medium of claim 15, wherein the geometry reconstruction program is a sparse Simultaneous Localization and Mapping (SLAM) module.

17. The non-transitory computer-readable storage medium of claim 15, wherein the manipulator moves the one or more objects for a predetermined distance with an angular motion defined around the one or more objects.

18. The non-transitory computer-readable storage medium of claim 15, wherein a direction of the moving step is determined based on an artificial potentials approach, wherein a centroid of the one or more objects has a repulsive potential, and limits of the workspace have a repulsive potential.

19. The non-transitory computer-readable storage medium of claim 15, wherein the moving steps are performed according to workspace constraints related to a moving distance and direction of motion.

20. The non-transitory computer-readable storage medium of claim 18, wherein the moving distance is determined so as to avoid the one or more objects to exceed limits of the workspace by using angle as a first moment $\alpha_p$ of a Gaussian distribution with variance $\sigma_p^2$.

21. The non-transitory computer-readable storage medium of claim 20, wherein the limits of the workspace are defined edges of the workspace.

* * * * *